US008165095B2

(12) United States Patent
Stratis et al.

(10) Patent No.: US 8,165,095 B2
(45) Date of Patent: Apr. 24, 2012

(54) SYSTEM AND METHOD TO IMPROVE RF SIMULATIONS

(75) Inventors: Glafkos Stratis, Lake Worth, FL (US); Alexander Bijamov, Plantation, FL (US); Celestino A. Corral, Ocala, FL (US); Salvador Sibecas, Lake Worth, FL (US)

(73) Assignee: Motorola Mobility, Inc., Libertyville, IL (US)

( * ) Notice: Subject to any disclaimer, the term of this patent is extended or adjusted under 35 U.S.C. 154(b) by 1180 days.

(21) Appl. No.: 11/948,752

(22) Filed: Nov. 30, 2007

(65) Prior Publication Data

US 2009/0140949 A1 Jun. 4, 2009

(51) Int. Cl.
*H04W 4/00* (2009.01)
*H04W 16/32* (2009.01)
*H04Q 7/20* (2006.01)

(52) U.S. Cl. ........ 370/332; 370/334; 455/466; 455/456; 455/446; 342/360; 342/176

(58) Field of Classification Search .................. 370/310, 370/332, 334, 339; 343/876; 342/172, 360; 455/446, 456, 466
See application file for complete search history.

(56) References Cited

U.S. PATENT DOCUMENTS 5,151,704 A 9/1992 Gunmar et al.
5,748,146 A 5/1998 Grove et al.
5,920,285 A 7/1999 Benjamin
5,973,638 A * 10/1999 Robbins et al. ............... 342/172
6,199,032 B1 3/2001 Anderson
6,236,363 B1 * 5/2001 Robbins et al. ............... 342/360
6,499,006 B1 12/2002 Rappaport et al.
6,625,135 B1 * 9/2003 Johnson et al. ............... 370/332
6,971,063 B1 11/2005 Rappaport et al.
7,155,228 B2 12/2006 Rappaport et al.
7,212,160 B2 5/2007 Bertoni et al.
7,246,045 B1 7/2007 Rappaport et al.
7,277,731 B2 10/2007 Stratis et al.
7,289,811 B2 * 10/2007 Sawaya et al. ................ 455/446
7,310,379 B2 12/2007 Sibecas et al.
7,313,402 B1 * 12/2007 Rahman et al. ............ 455/456.1
7,333,897 B2 2/2008 Stratis et al.
2004/0125880 A1 7/2004 Emami et al.
(Continued)

OTHER PUBLICATIONS

Marco Allegretti et al., Simulation in Urban Environment of a 3D Ray Tracing Propagation Model Based on Building Database Preprocessing, http://www.ursi.org/Proceedings/ProcGA05/pdf/CP1.7(0958).pdf, 2005, 8 pages.

(Continued)

*Primary Examiner* — Hassan Kizou
*Assistant Examiner* — Emmanuel Maglo
(74) *Attorney, Agent, or Firm* — Pablo Meles; Sylvia Chen

(57) ABSTRACT

A system (100) and method (400) for improving Radio Frequency (RF) Antenna Simulation is provided. The method can include determining (402) a proximity of an antenna (250) to a scattering structure (210), determining (410) a switching distance to the scattering structure that establishes when to switch the antenna on (416) and off (418) from a composite antenna pattern to a free space antenna pattern, and predicting RF coverage of the antenna responsive to the switching. The switching distance can be a function of a material type and a surface geometry of the scattering structure and a wavelength of the antenna. The method can also include evaluating a sensory mismatch in the antenna, and using a composite antenna pattern corresponding to the sensory mismatch.

20 Claims, 10 Drawing Sheets

U.S. PATENT DOCUMENTS

2005/0032531 A1 2/2005 Gong et al.
2006/0269020 A1 11/2006 Vicharelli et al.

OTHER PUBLICATIONS

Arye Nehorai and Eytan Paldi, Vector-Sensor Array Processing for Electromagnetic Source Localization, IEEE Transactions on Signal Processing, Feb. 1994, pp. 376-398, vol. 42 No. 2.

Colin E. Brench and Bronwyn L. Brench, EMI Measurements and Modeling—More Similar than You'd Think!, IEEE EMC Society Newsletter Online, http://www.ieee.org/organizations/pubs/newsletters/emcs/summer01/pp_brench.htm, Summer 2001, 9 pages.

REMCOM, Inc., VariPose: Repositions Human Meshes Including Internal Structures presentation, 2004, 16 pages, Pennsylvania, USA.

SAIC, Urbana(TM) 3-D Wireless Toolkit product description, www.saic.com/products/software/urbana/application.html, downloaded Aug. 23, 2010, 2 pages.

Thomas Kurner et al., Concepts and Results for 3D Digital Terrain-Based Wave Propagation Models: An Overview, IEEE J. on Selected Areas in Comm., Sep. 1993, pp. 1002-1012, vol. 11 issue 7.

Patent Cooperation Treaty, PCT Search Report and Written Opinion of the International Searching Authority for International Application No. PCT/US2008/084110, Apr. 27, 2009, 11 pages.

* cited by examiner

POLARIZATION

400

Dipole in free space

450

Three-Dimensional
dipole antenna pattern

500

600

SYSTEM AND METHOD TO IMPROVE RF SIMULATIONS

FIELD OF THE INVENTION

The embodiments of the present invention generally relate to systems and methods for RF simulation tools, and more particularly to a system and method to improve RF simulation through use of composite antenna patterns.

BACKGROUND

Various antenna types are known for use in handheld communication devices.

In a Radio Frequency (RF) simulation, an antenna can be represented as an antenna model to evaluate RF coverage. The antenna model describes how the antenna radiates RF energy.

In current practices, RF simulation tools use one-dimensional (1-D) antenna models or three dimensional (3-D) models, and are generally sufficient for evaluating RF coverage on a macro cellular scale. For example, a one-dimensional or 3-D antenna pattern is usually adequate to model RF coverage of a large cellular tower that is physically located in an open environment.

Recently, however, with the implementation of micro-cellular infrastructures in Wireless Local Area Networks (WLANS), the antenna may be small and physically located in a closed environment, which affects RF coverage. The microcellular antennas may be within the proximity of wall structures or embedded in environments, such as a vehicle, having complex surfaces. In these environments, a one-dimensional antenna pattern is insufficient to predict RF coverage.

As is known, antenna design is based on at least three major parameters, namely: return loss, efficiency and radiation pattern. In most RF planning tools the radiation pattern which is usually 1-D, consists of one cut of the vertical plane, digitized and then used in the RF planning tool as the radiated energy at one plane only. Although some RF planning tools have introduced 3-D radiation patterns, these patterns lack the ability to incorporate effects of nearby scattering structures. Consequently, the RF planning tools can produce inaccurate simulations, and system deployment based on such RF planning tools can lead to unpredictable results.

SUMMARY

In one embodiment of the present disclosure, a method for improving Radio Frequency (RF) Antenna Simulation is provided. The method can include determining a proximity of an antenna to a scattering structure, determining a switching distance to the scattering structure that establishes when to switch the antenna on and off from a composite antenna pattern to a free space antenna pattern, and predicting RF coverage of the antenna using either the composite antenna pattern or the free space antenna pattern responsive to the switching. The switching distance can be a function of a material type and a surface geometry of the scattering structure and a wavelength of the antenna. The switching distance can also be triggered in response to detecting a sensory mismatch in the antenna. A composite antenna pattern can be used corresponding to the sensory mismatch.

The composite antenna pattern can be used if the proximity to at least one facet of the scattering structure is less than the switching distance. The composite antenna pattern includes polarization and radiation pattern corrections associated with a material type and a surface geometry of the scattering structure. In this case, reflective contributions of the at least one facet are turned off when predicting the RF coverage. Alternatively, the free space antenna pattern can be used if the proximity to the at least one facet of the scattering structure is greater than the switching distance. In this case reflective contributions of the at least one facet are turned on when predicting the RF coverage.

The method can also include selecting from an antenna pattern database a composite antenna pattern corresponding to the proximity to the scattering structure and the parameters of the scattering structure. For example, the antenna pattern database can include mappings for a plurality of composite antenna patterns for a plurality of distances, material types and surface geometries of the scattering structure. The antenna pattern database can also include mappings for antenna sensory mismatches.

In another embodiment of the present disclosure a computer-readable storage medium operating in a Radio Frequency (RF) planning tool can account for a proximity of an antenna to a scattering structure to predict RF coverage. The storage medium can include computer instructions for determining a switching distance that is a function of a material type of the scattering structure, a surface geometry of the scattering structure, and a wavelength of the antenna. The material type of the scattering structure can be metallic, dielectric, or inhomogeneous. The type of surface of the scattering structure can be wedge or flat.

In one arrangement, an antenna sensory mismatch can be evaluated to determine which composite antenna patterns are used. The antenna sensory mismatch can be characteristic of a scattering structure in the proximity. A composite antenna pattern corresponding to the sensory mismatch can be used for the antenna's radiation pattern and polarization to account for effects of the scattering structure.

In another arrangement, the scattering structure can be identified from a geographical database based on a location of the antenna. The method can include switching to a composite antenna pattern if the proximity to at least one facet of the scattering structure is less than the switching distance, and switching to a free space antenna pattern if the proximity to the at least one facet of the scattering structure is greater than the switching distance. Reflective contributions of the at least one facet can be turned off if the proximity to at least one facet of the scattering structure is less than the switching distance. Reflective contributions of the at least one facet can be turned on if the proximity to at least one facet of the scattering structure is greater than the switching distance.

In another embodiment of the present disclosure, a wireless communication device can include an antenna, a transceiver operatively coupled to the antenna to transmit and receive Radio Frequency (RF) communications, and a controller to determine a proximity of the antenna to at least one facet of a scattering structure. The controller can further determine a switching distance that establishes when to switch on and off from a composite antenna pattern to a free space antenna pattern, predict RF coverage of the antenna using the composite antenna pattern or the free space antenna pattern responsive to the switching, and adjust a directionality of the antenna to compensate for RF coverage losses due to the at least one facet of the scattering structure.

The wireless communication device can include a global positioning system (GPS) to determine a location of the wireless communication device, wherein the controller determines from a geographical database the scattering structure corresponding to the location. The controller can switch to a composite antenna pattern if the proximity to the at least one facet is less than the switching distance, and disregard reflective contributions of the at least one facet when predicting the RF propagation. The controller can switch to a free space antenna pattern if the proximity to the at least one facet is greater than the switching distance, and include reflective contributions of the at least one facet when predicting the RF propagation.

The controller can also analyze the antenna's radiation pattern for a sensory mismatch loss. The controller can then select a composite antenna pattern corresponding to the sensory mismatch loss. The sensory mismatch loss can be characteristic of nearby scattering structures, and the selected composite antenna pattern can compensate for sensory mismatch loss from the antenna's radiation pattern and polarization.

BRIEF DESCRIPTION OF THE DRAWINGS

The features of the system, which are believed to be novel, are set forth with particularity in the appended claims. The embodiments herein can be understood by reference to the following description, taken in conjunction with the accompanying drawings, in the several figures of which like reference numerals identify like elements, and in which:

DETAILED DESCRIPTION

Figure 1:
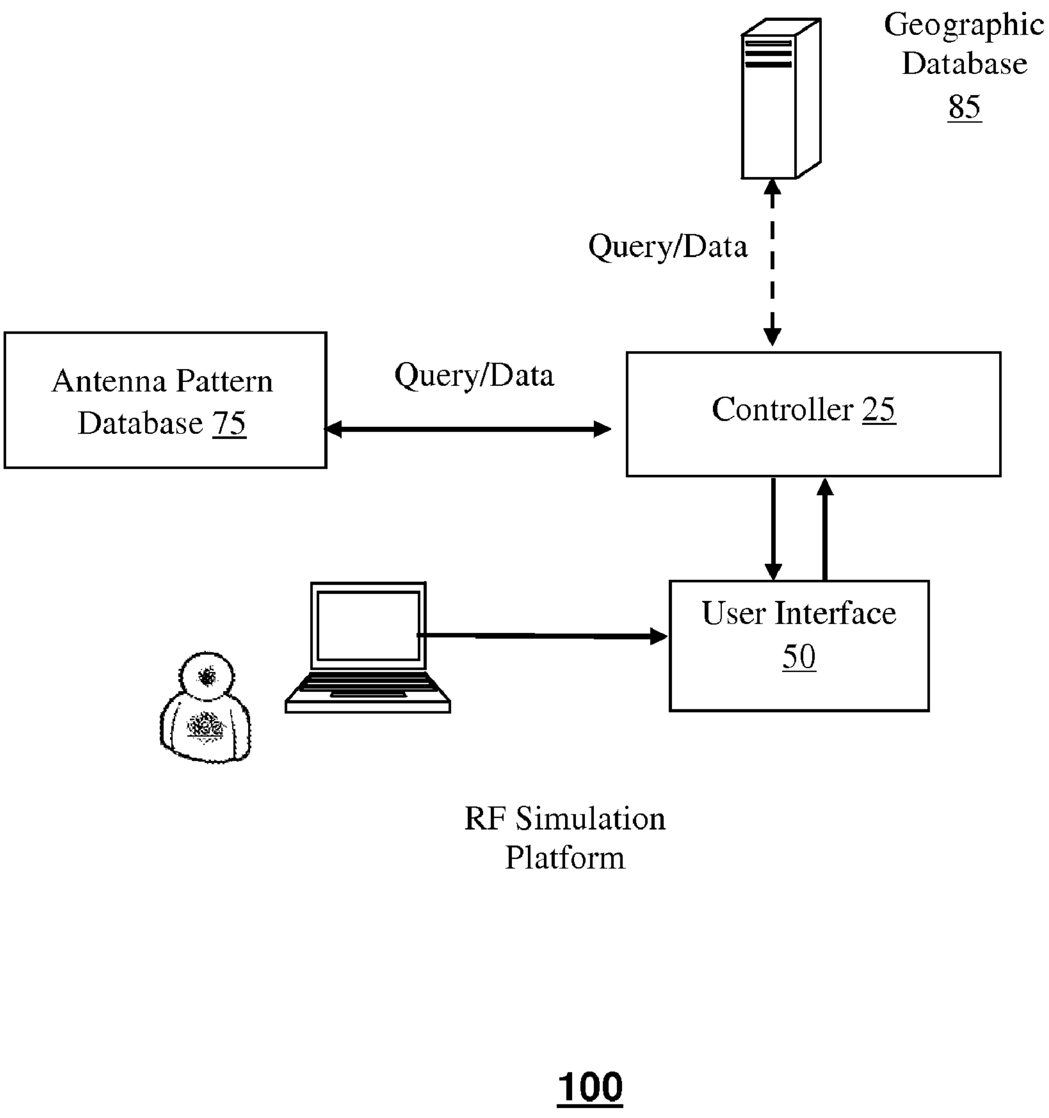
FIG. 1 depicts a Radio Frequency (RF) simulation platform in accordance with the embodiments of the invention.

While the specification concludes with claims defining the features of the embodiments of the invention that are regarded as novel, it is believed that the method, system, and other embodiments will be better understood from a consideration of the following description in conjunction with the drawing figures, in which like reference numerals are carried forward.

As required, detailed embodiments of the present method and system are disclosed herein. However, it is to be understood that the disclosed embodiments are merely exemplary, which can be embodied in various forms. Therefore, specific structural and functional details disclosed herein are not to be interpreted as limiting, but merely as a basis for the claims and as a representative basis for teaching one skilled in the art to variously employ the embodiments of the present invention in virtually any appropriately detailed structure. Further, the terms and phrases used herein are not intended to be limiting but rather to provide an understandable description of the embodiment herein.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "controller" can be defined as any number of suitable processors, controllers, units, or the like that carry out a pre-programmed or programmed set of instructions. As used herein, a "scattering structure" can mean any structure that that alters a radiation pattern or polarization of an antenna. A "composite antenna pattern" can mean a pattern that includes polarization and radiation pattern corrections associated with particular distances, a material type and/or a surface geometry of a scattering structure. The radiation pattern obtained when an antenna is mounted away from the influence of nearby buildings, trees, hills, other objects or the earth is usually referred to as a "free space antenna pattern". A "material type" can usually refer to the type of material used in an antenna or a structure that will alter a radiation pattern or polarization of an antenna. The "surface geometry" can mean the shape of a surface of a structure such as a wedge, flat or pointed shape. "Facet" in the context of antennas usually refers to surfaces on structures that affect a radiation pattern.

Referring to the drawings, and in particular to FIG. 1, an exemplary RF simulation platform is shown and generally represented by reference numeral 100. RF simulation platform 100 can include a controller 25, a user interface 50, antenna pattern database 75, and optionally a geographical database 85. The present disclosure contemplates that the controller 25, the user interface 50, the antenna pattern database 75, and the geographical database 85 can be separate components or can be integrated with each other, such as in a single processor or computer. The RF simulation platform 100 can include associated writeable memory, which is preferably non-volatile, to serve as a data repository for various variables, data or other information, such as storing operational variables that have been determined based upon scattering structure parameters or antenna patterns that were measured or otherwise predetermined.

The antenna pattern database 75 includes composite antenna patterns and free space antenna patterns. The antenna patterns have been developed and verified using various methods. Simple antenna patterns (e.g. free space) are represented by theoretical and mathematical radiation patterns. Complex antennas patterns (e.g. composite patterns) within proximity to inhomogeneous scattering structures are represented by numerical computational Electromagnetic (EM) methods and measurements, such as the Finite Difference Time Domain Method (FDTD) method, which is recognized by the IEEE standards for specific absorption rate (SAR). Composite antenna patterns in the database 75 correspond to predetermined mappings that incorporate a proximity of an antenna to a scattering structure, the material type and geometry of the scattering structure, and the wavelength of the antenna.

The composite antenna patterns can also incorporate antenna sensory mismatch losses due to physical characteristics of scattering structures. Antenna sensory mismatch can occur when the antenna is in proximity to a scattering structure that alters the radiation pattern or polarization of the antenna. As an example, an antenna in proximity to a scattering structure may exhibit a radiation pattern and polarization that is different than if the antenna is not in proximity to the scattering structure. The difference in radiation pattern and polarization can be due to material or structural features of the scattering structure.

The controller 25 can evaluate an antenna's sensory mismatch and identify composite antenna patterns in the antenna pattern database 75 that correspond to the sensory mismatch. In such regard, the controller 25 can select from the database 75 composite antenna patterns that compensate for antenna sensory mismatch losses due to the nearby scattering structure. Antenna sensory mismatch can be evaluated when the antenna is in a confined region, for example, in a closed environment where numerous reflective surfaces (e.g. desks, tables, chairs, etc.) are in close proximity to the antenna. As another example, a person's head may constitute a reflective object if the antenna is part of a headset coupled to the person's ear.

Figure 2:
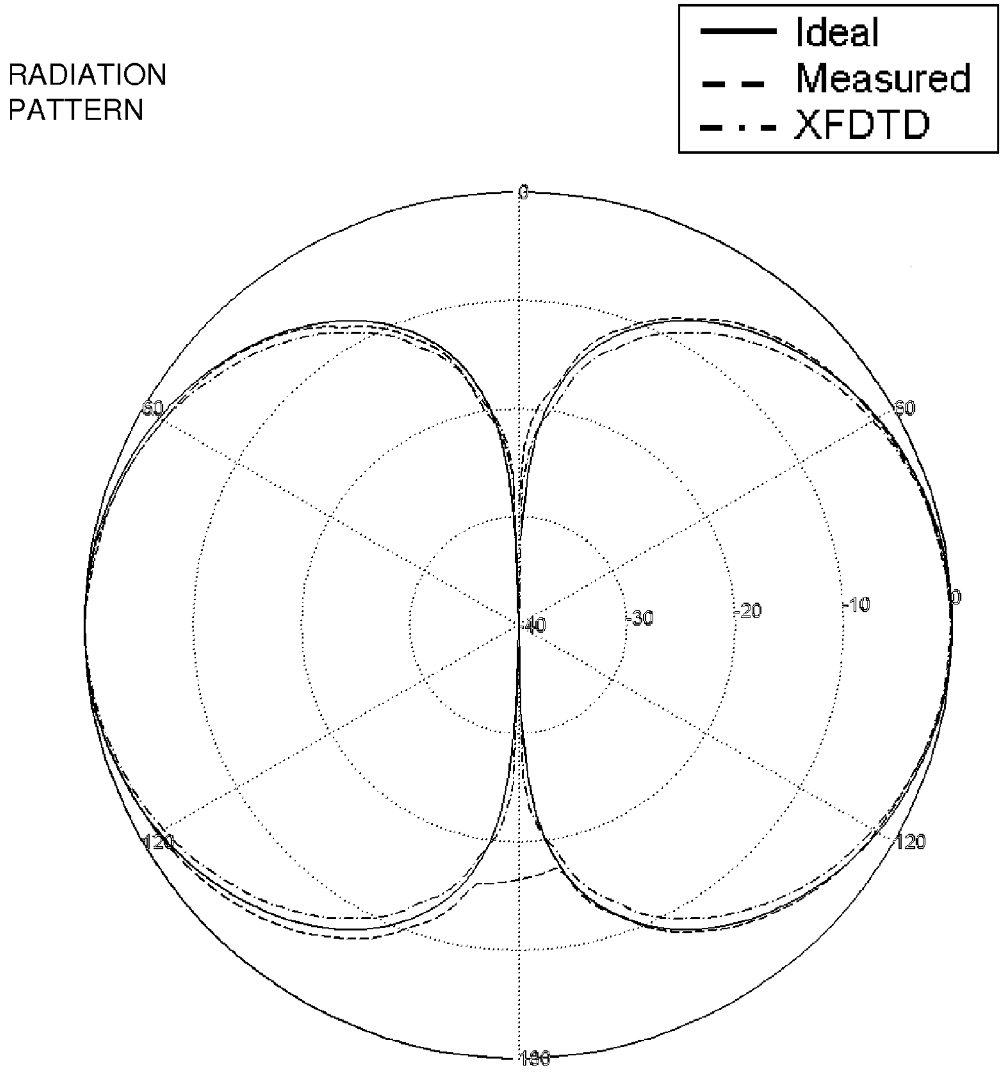
FIG. 2 depicts a dipole radiation pattern for an antenna in free space in accordance with the embodiments of the invention.
Figure 3:
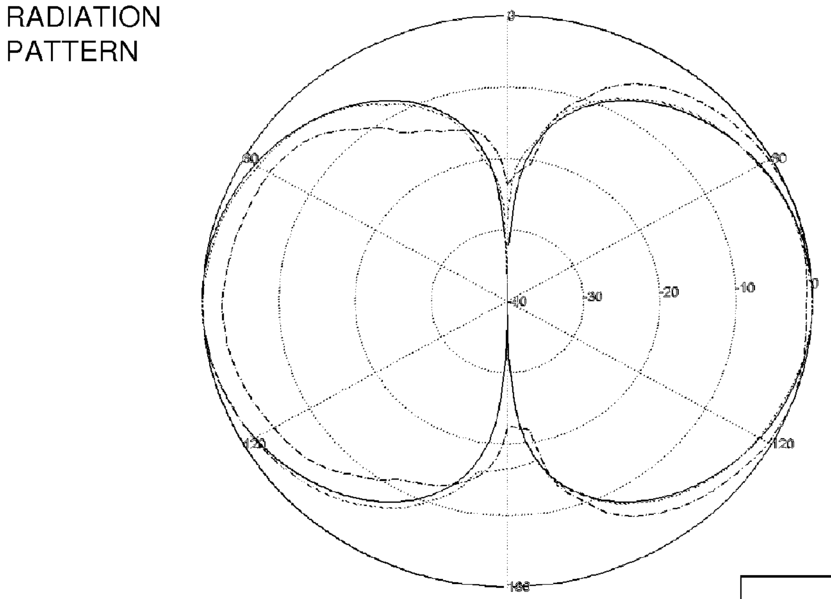
FIG. 3 depicts a dipole radiation pattern for an antenna within proximity of a dielectric scattering structure in accordance with the embodiments of the invention.
Figure 4:
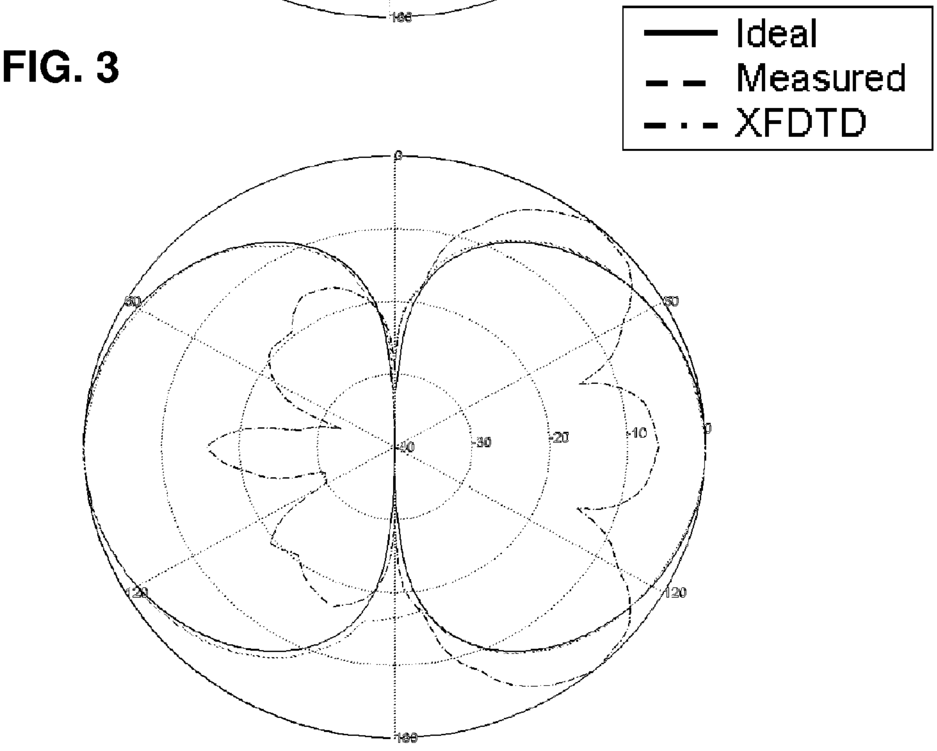
FIG. 4 depicts a dipole radiation pattern for an antenna within proximity of an inhomogeneous lossy scattering structure in accordance with the embodiments of the invention.

FIGS. 2-4 show exemplary antenna patterns stored in the antenna pattern database 75. FIG. 2 shows a radiation pattern of a dipole antenna pattern in "free-space", for example, an antenna that is not in close proximity to a scattering structure. In FIG. 2, three plots corresponding to three different methods for calculating the radiation patterns are shown: theoretical, measured, and FDTD. In contrast FIGS. 3 and 4 show radiation patterns for an antenna that is in close proximity to a scattering structure. For example, FIG. 3 shows an experimentally determined composite antenna pattern (see XFDTD) representing a dipole with an antenna frequency of 5 GHz within proximity of a "pure dielectric" scattering structure. A pure dielectric is characterized as an approximately lossless medium. FIG. 4 shows a radiation pattern representing the same dipole within proximity of an "inhomogeneous" scattering structure. An inhomogeneous scattering structure is characterized as a lossy medium that increases conductivity. Notably, the material type properties of the scattering structure affect the extent of the radiation patterns.

Figure 5:
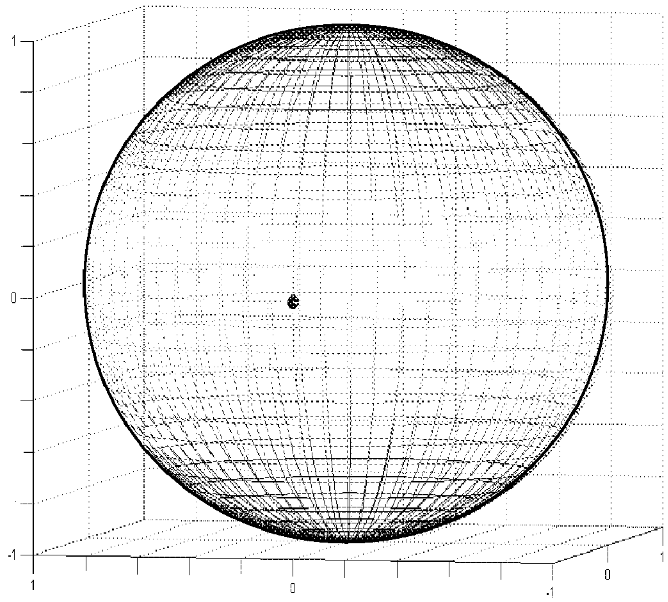
FIG. 5 illustrates polarization states of a dipole antenna in free space represented and mapped on a Poincare sphere in accordance with the embodiments of the invention.
Figure 6:
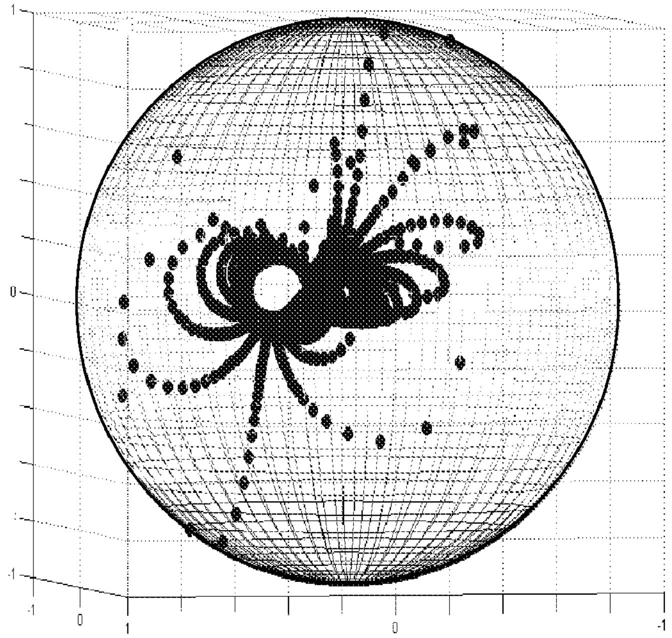
FIG. 6 illustrates polarization states of a dipole antenna in proximity of a scattering structure represented and mapped on a Poincare sphere in accordance with the embodiments of the invention.

Returning back to FIG. 1, antenna patterns in the database 75 are also accompanied by polarization corrections for the scattering structure. Polarization is the property of electromagnetic waves, such as light, that describes the direction of the transverse electric field. In general, a dipole antenna in free space is parallel along the z axis and perpendicularly oriented on the x-y plane and is treated as a vertically polarized antenna. If that same dipole antenna though, is located close to a complex scattering structure then the antenna depolarizes depending on the material properties and the complexity of the structure. In such case, the antenna cannot be treated as a vertically polarized antenna. In general, polarization can be represented and mapped on a Poincare sphere. In FIG. 5, the Poincare sphere represents a dipole antenna in free space, with the equivalent polarization state and the corresponding polarization state. FIG. 6 represents the same dipole antenna within the proximity of a dielectric flat surface. The information related to these polarization spheres can be retrieved from the antenna pattern database 75.

Returning back to FIG. 1, the controller 25 generally attempts to first identify antenna sensory mismatch due to reflective objects in a closed environment for selecting composite antenna patterns. Detecting a sensory mismatch can be advantageous in a closed environment where numerous small structures are present and where a precise location of the antenna is not available. For example, a GPS location may not have sufficient resolution in closed environments. In such cases, the controller 25 employs sensory mismatch detection to select composite antenna patterns.

The geographical database 85 can be optionally used to identify scattering structures if the antenna is located in an open environment. As an example, the antenna may be located in an outdoor environment where numerous large buildings are present. In an open environment, the controller 25 can revert to using the geographic database 85 in settings where a GPS location of the antenna is known. This can be advantageous since the GPS location has sufficient resolution to identify large structures in an open area. In the case where the antenna is located in an open environment, the controller 25 can inquire the geographic database 85 with the antenna's location to retrieve parameters associated with scattering structures, such as material type (e.g. metallic, lossy, or pure dielectric) and surface geometry (e.g., wedge, flat, pointed) of the scattering structures. The scattering structure can be a building, a vehicle, or any other object.

As an example within a broad area, the controller 25 can receive an antenna's location and orientation in an environment. The controller 25 can inquire the geographic database 85 for information related to a scattering structure in vicinity of the antenna. The geographic database 85 can provide a material type and surface geometry of the scattering structure. The controller 25 can then determine a proximity, such as a distance in one or more directions to one more facets of the scattering structure. The controller 25 can then retrieve from the antenna pattern database 75 a composite antenna pattern and polarization specific to the proximity, the material type, and the surface geometry of the scattering structure. The controller 25 handles depolarization by selecting from the database 75 antenna patterns and polarization corrections corresponding to the antenna's proximity to the scattering structure and the type of scattering structure. The antenna patterns and polarization corrections are already mapped to predetermined antenna proximities and scattering structure parameters. Alternatively, the controller 25 can retrieve a free space antenna pattern if it is determined that the antenna is not in close proximity to a scattering structure. The present disclosure also contemplates the use of other components, and combinations of components that can receive and/or retrieve scattering structure parameters; retrieve, receive and/or generate high order antenna patterns; retrieve, receive and/or generate non-linear antenna patterns from the high order patterns; and/or predict RF coverage with respect to one or more simulations.

Figure 7:
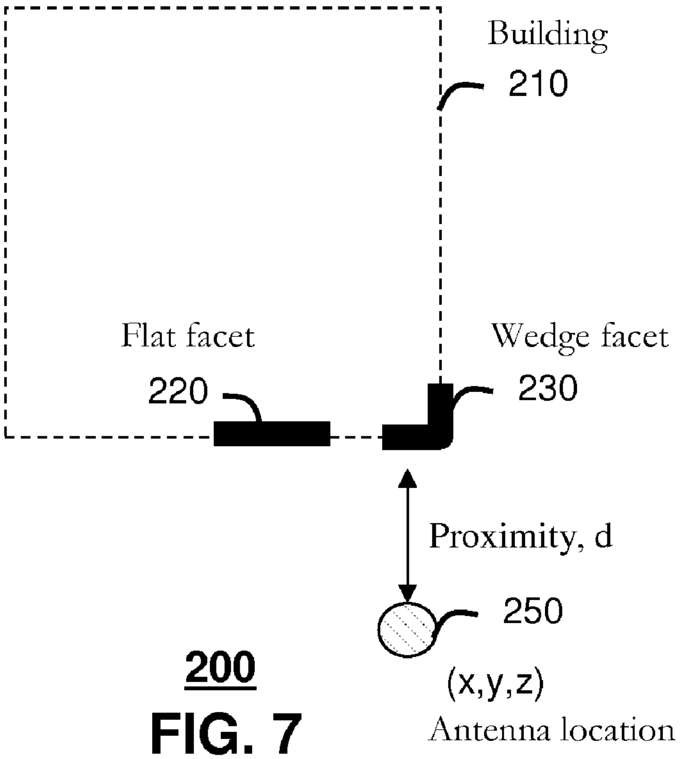
FIG. 7 pictorially illustrates an antenna in close proximity to a scattering structure in accordance with the embodiments of the invention.

FIG. 7 is a pictorial diagram of a wireless environment 200 comprising an antenna 250 and a scattering structure 210. The antenna 250 is shown within a proximity, d, to the scattering structure 210; the proximity can be a distance or any other measure of increment. As an example, the scattering structure 210 can be a building, though other scattering structures are herein contemplated, such as a human head. The antenna 250 can be a component of a wireless communication device such as a cell phone, laptop, portable music player, or any other suitable communication device.

In the exemplary diagram of FIG. 2, a free space antenna pattern may be insufficient for modeling the RF coverage of the antenna 250 if the antenna is in close proximity to the scattering structure 210. As shown, the scattering structure 210 may include one or more facets, such as a flat facet 220 or a wedge facet 230. The geometrical shape (e.g. flat 220, wedge 230, etc.) of the facet, the dielectric properties of the facet, and the operating frequency of the antenna 250 (e.g. wavelength) can collectively affect the radiation pattern and polarization of the antenna 250, and hence the RF coverage. Accordingly, if the antenna 250 is within a certain proximity based on parameters of the scattering structure, a composite antenna pattern can be used to account for reflections off of the scattering structure 210.

Figure 8:
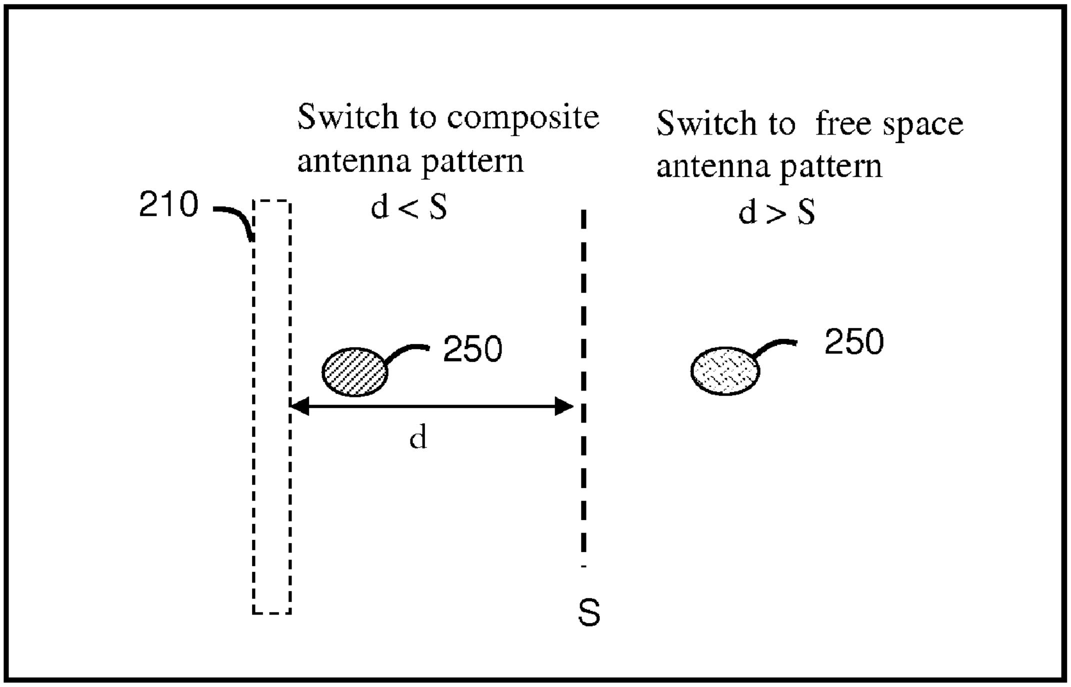
FIG. 8 pictorially illustrates switching between a composite antenna pattern and a free space pattern based on a proximity and switching distance of a scattering structure in accordance with the embodiments of the invention.

The RF simulation platform 100 of FIG. 1 can model RF coverage of the antenna 250 in the exemplary wireless environment 200 and account for the antenna's proximity to the scattering structure 210. In particular, the RF simulation platform 100 can switch on and off from a composite antenna pattern to a free space antenna pattern and vice versa. The composite antenna patterns account for changes in RF radiation and polarization due to the effects of the scattering structure 210 on the antenna 250 when it is in close proximity. As shown in FIG. 8, the controller 25 (see FIG. 1) can switch between a composite antenna pattern and a free space antenna pattern depending on the proximity, d, and a switching distance, S. For example, if the proximity is less than the switching distance (e.g. $d<S$) a composite antenna pattern is used. If the proximity is greater than the switching distance (e.g. $d>S$) a free space antenna pattern is used.

The switching distance establishes when the composite antenna pattern will be switched in place of the free space antenna pattern to predict RF coverage. The distance where the antenna pattern switches on and off is a function of material, physical shape and antenna wavelength, although it can be a function of other parameters. The switching distance, S, can be described by the mathematical function below:

$$S=f(m, g, \lambda)$$

In this case m, represents the material dielectric and magnetic properties; g represents the geometry of the scattering structure (wedge, flat wall, human head) and λ the operating wavelength. In the current implementation, the geometries are classified as flat surfaces or wedges on vehicles or building corners, though they can be other types for more complex applications, such as antennas embedded in various structures.

The antenna wavelength or frequency is also significant on the switching distance, S, between free space pattern or composite antenna pattern. In lower frequencies the switching distance, S, is higher compared to higher frequencies. In ultra-wideband applications where a wide range of frequencies are encountered, the switching distance, S, can be based on the lower frequency bands, which inherently cover the upper or higher band frequencies.

Figure 9:
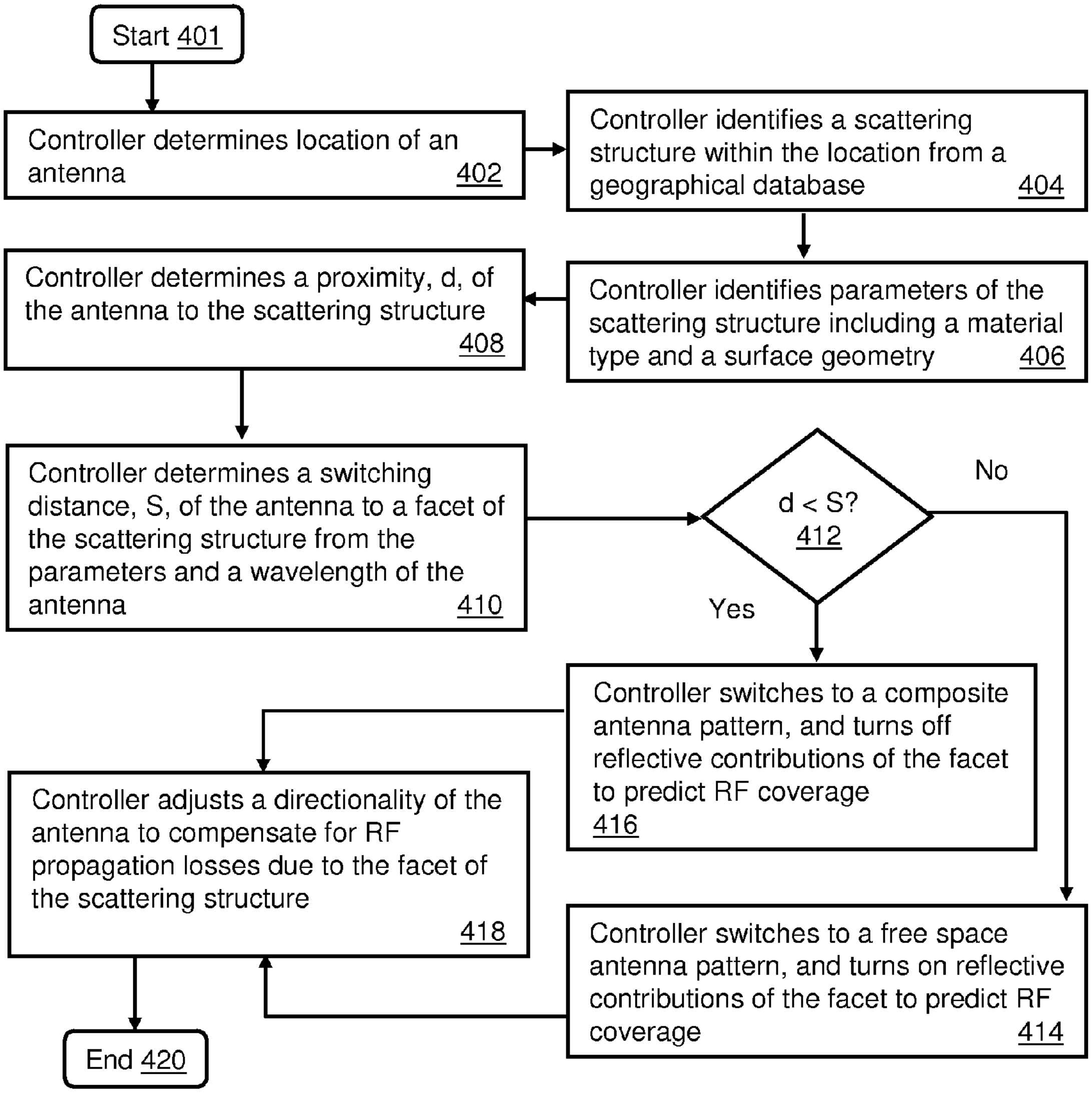
FIG. 9 depicts a method for improving RF simulations in accordance with the embodiments of the invention.

Referring to FIG. 9, a method 400 for improving RF simulations is shown. The method 400 can be practiced with more or less than the number of steps shown. To describe the method 400, reference will be made to FIGS. 1-3, although it is understood that the method 400 can be implemented in any other manner using other suitable components.

The method 400 can begin at state 401. At step 402, the controller 25 can determine a location of the antenna 250. The location can correspond to a geographic position, for example, a global positioning system (GPS) longitude and latitude coordinate. In a RF simulation, the location of the antenna 250 may be known, and selected by the system designer. The location can be expressed in Cartesian, polar, or any other coordinate notation. In another arrangement, for example, in a field, a wireless communication device comprising the antenna 250 may report a location to the RF simulation platform 100, for example, using a built-in GPS unit.

At step 404, the controller 25 can identify from the geographical database 85 a scattering structure approximate to the location. For example, the controller 25 can submit to the database 85 a request for scattering structures in a vicinity of the GPS location. The database 85 can identify the scattering structure 210 and parameters associated with the scattering structure 210.

At step 406, the controller 25 can identify a material type and a surface geometry of the scattering structure from the information supplied by the geographic database 85. The material type can be metallic, dielectric, or inhomogeneous, and the type of surface can be wedge 220 or flat 230, as previously noted. As is known, the material type and surface geometry of the scattering structure can affect the radiation pattern and polarization of the antenna 250 when it is in close proximity to the scattering structure 210.

At step 408, the controller 25 can determine the proximity, d, of the antenna to the scattering structure 210. The proximity can correspond to the distance between the antenna 250 and the scattering structure 210. In one arrangement, the proximity can be represented as 3 distances: x, y, and z. The controller 25 can identify which facet is closest to the antenna 250 based on the proximity, d. For example, as shown in FIG. 7 the controller 25 can identify the wedge facet 230 of the scattering structure 210 as the closest portion to the antenna 250 at location (x,y,z).

At step 410, the controller 25 can determine the switching distance, S, of the antenna to a facet of the scattering structure 210 from the parameters and antenna wavelength. Recall, the switching distance, S, is a function of the material type and the surface geometry of the scattering structure 210, and the wavelength of the antenna 250.

If at step 412, the proximity, d, of the antenna is greater than the switching distance, S, the controller 25 can use a free space antenna pattern, and turn on reflective contributions of the facet to predict RF coverage as shown in step 414. The reflective contributions of the facet are used since the antenna is sufficiently far away from the scattering structure and at a location where radiation can reflect off these surfaces in accordance with a simple antenna model. The controller 25 can retrieve the free space antenna pattern from the antenna pattern database 75 (see FIG. 1).

Figure 10:
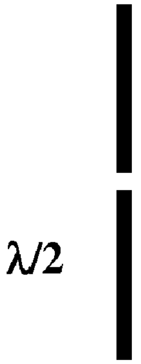
FIG. 10 depicts a dipole in free space in accordance with the embodiments of the invention.
Figure 11:
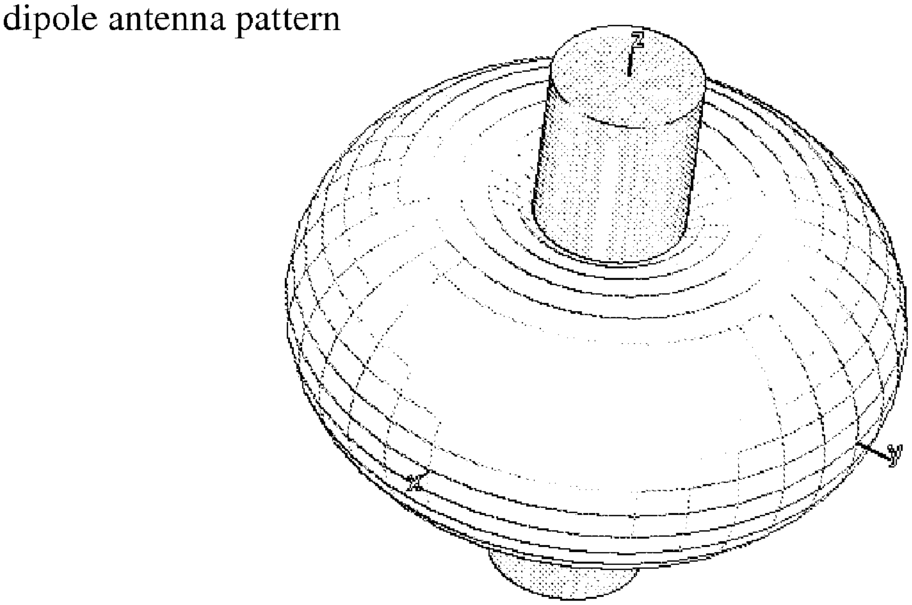
FIG. 11 depicts a three-dimensional dipole antenna pattern for the depiction shown in FIG. 10.

Briefly, FIG. 10 is a representation of a dipole antenna with wavelength λ in free space. A three-dimensional (3-D) free space antenna pattern retrieved from the antenna pattern database 75 and corresponding to the dipole antenna is shown in FIG. 11. Notably, the 3-D antenna pattern is relatively symmetrical and non-directional since it is in free space, and there are no scattering structures in close proximity to distort the antenna pattern.

Returning back to step 412 of FIG. 9, if however, the proximity, d, of the antenna is less than the switching distance, S, the controller 25 switches to a composite antenna pattern, and turns off reflective contributions of the facet to predict RF coverage as shown in step 416. The reflective contributions of the facet are not used since the antenna is sufficiently close to the scattering structure and at a location where reflection effects are already accounted for in the composite antenna patterns used. The controller 25 can inquire the antenna pattern database 75 for the composite antenna pattern (e.g., metallic, lossy, or dielectric) according to the proximity and scattering structure parameters (see FIG. 1). Recall, the antenna pattern database 75 includes mappings for a plurality of composite antenna patterns and polarization corrections to a plurality of proximities and corresponding scattering structures 210. As previously noted, depolarization effects of the scattering structure are taken into account in the composite antenna patterns.

Figure 12:
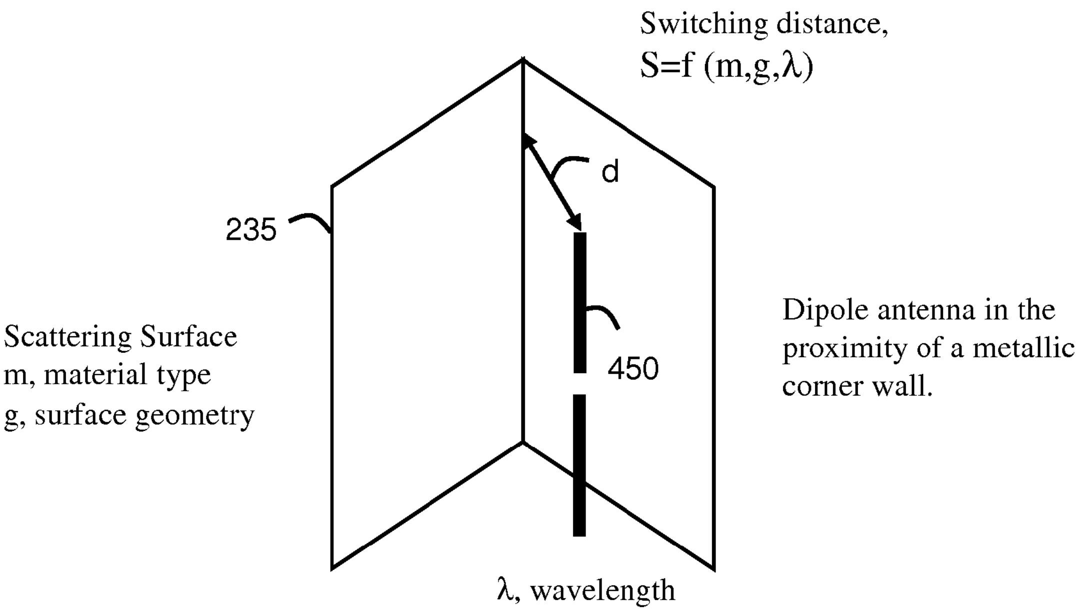
FIG. 12 depicts a dipole within proximity to a scattering structure in accordance with the embodiments of the invention.

Briefly, FIG. 12 illustrates a dipole antenna 450 in close proximity to a scattering structure, such as a metallic corner 235 of a building. The metallic corner has a significant impact on the return loss of the antenna, radiation pattern, and the input impedance of the antenna. In this arrangement, the free space omni-directional antenna pattern of FIG. 11 does not apply. The radiation pattern becomes directional, as a result of the conductivity of the metallic corner, as shown in FIG. 12.

The switching distance S, where the controller 25 switches antenna pattern from free space antenna pattern to composite antenna pattern, is generally maximum for metallic scattering structures and minimum for the dielectric scattering structures. That is, the antenna pattern is strongly affected when the nearby scattering structure is metallic. On the other hand the radiation pattern is less affected when the nearby scattering structure is a pure dielectric. For the polarization the effect is opposite. The depolarizing effects are stronger when the nearby scattering structure is a pure dielectric, whereas the depolarizing effects are less when the nearby scattering structure is metallic. Although the depolarization is still linear when the nearby scattering structure is metallic, the antenna is not completely depolarized.

Figure 13:
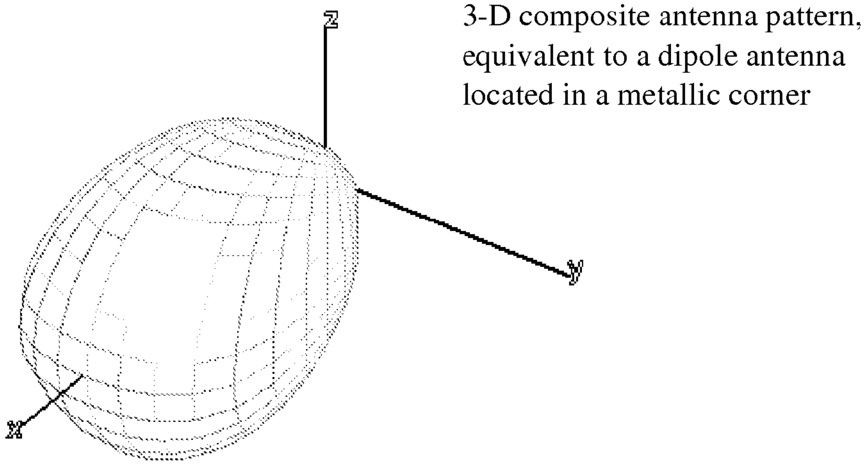
FIG. 13 depicts a three-dimensional dipole antenna pattern for the depiction shown in FIG. 12.

FIG. 13 shows an exemplary 3-D composite antenna pattern retrieved from the antenna pattern database 75 for the arrangement shown in FIG. 12. The 3-D composite radiation pattern is a function of geometrical shape of the scattering structure 210, dielectric properties of the scattering structure 210, and the operating frequency of the antenna. Notably, the composite antenna pattern is more directional along one axis due to the conductivity of the metallic corner 235. The composite antenna pattern also includes polarization correction, which accounts to the depolarization of the antenna due to the scattering structure 210.

Returning back to FIG. 9 at step 418, the controller can optionally adjust a directionality of the antenna to compensate for RF propagation losses due to the facet of the scattering structure. At step 420, the method 400 can end.

Figure 14:
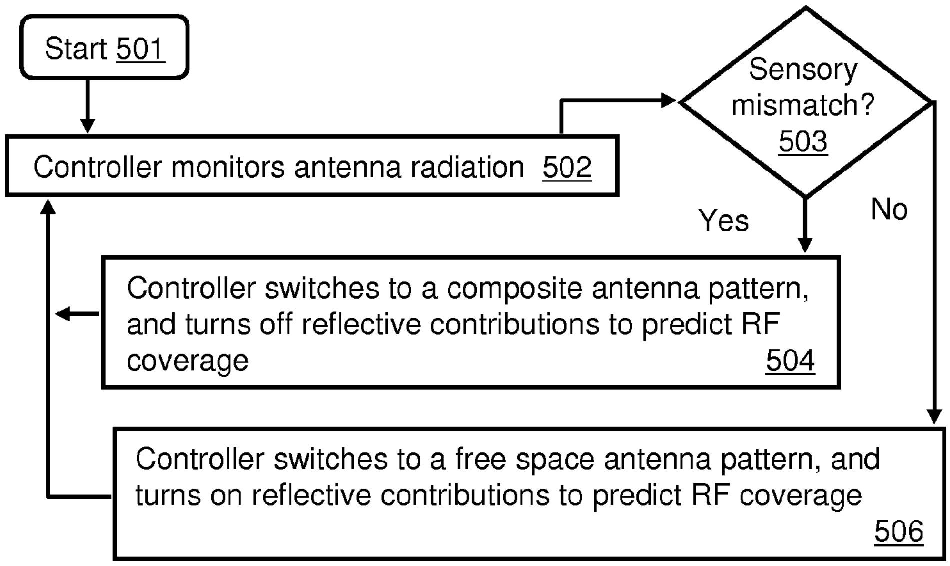
FIG. 14 depicts another method for improving RF simulations in accordance with the embodiments of the invention.

Referring to FIG. 14, another method 500 for improving RF simulations is shown. Briefly, the method 500 is directed to selecting antenna patterns based on evaluated antenna sensory mismatch losses. The method 500 can be practiced with more or less than the number of steps shown. To describe the method 500, reference will be made to components of FIG. 1, although it is understood that the method 500 can be implemented in any other manner using other suitable components.

The method 500 can begin at state 501. As an example, the method 500 can start in a state in which the antenna 250 is located in a closed environment. For instance, the antenna may be on a mobile communication device that is moving within the closed environment. At step 502, the controller 25 can monitor changes in the antenna's 250 radiation pattern and polarization. The changes can be associated with sensory mismatch losses in antenna radiation. As an example, the controller 25 can compare current radiation patterns and polarizations with previously stored patterns, and determine via a threshold operation if a sensory mismatch loss has occurred. As previously noted, a sensory mismatch can occur when the antenna's radiation pattern and polarization are affected by nearby scattering structures.

If at step 503, the controller 25 detects a sensory mismatch loss in antenna radiation, the controller 25 at step 504 can switch to a composite antenna pattern, and turn off reflective contributions to predict RF coverage. The controller 25 selects a composite antenna pattern corresponding to the sensory mismatch loss. For example, the controller 25 retrieves from the antenna database 75 a composite pattern that matches the sensory mismatch losses of the radiation pattern.

If however at step 503 the controller 25 does not detect a sensory mismatch loss, the controller 25 at step 506 can switch to a free space antenna pattern, and turn on reflective contributions to predict RF coverage. As previously noted, the free-space pattern does not include effects of nearby scattering structures in the composite antenna pattern, though includes reflections of the nearby scattering structures for predicting RF coverage.

The controller 25 can continue to monitor for antenna sensory mismatch losses at step 502 and continue to select between new composite antenna patterns and free-space antenna patterns based on the monitoring. The controller 25 can thus adapt its prediction of RF coverage in an intelligent manner based on analysis of sensory mismatch losses. Notably, the method 400 of FIG. 9 can also be used in conjunction with method 500 if a broad location of the antenna 250, for example, using GPS information, is sufficient for determining a switching distance.

From the foregoing descriptions, it would be evident to an artisan with ordinary skill in the art that the aforementioned embodiments can be modified, reduced, or enhanced without departing from the scope and spirit of the claims described below. For example, geometry is another factor that has significant implications on the radiation pattern and depolarization of the signal, when the antenna is within the proximity of the scattering structure. The RF simulation platform 100 can account for other geometries and distances besides flat and wedge shaped when determining polarization correction. In addition the RF simulation platform 100 can support polarometric signal processing. These are but a few examples of how the embodiments described herein can be updated without altering the scope of the claims below. Accordingly, the reader is directed to the claims for a fuller understanding of the breadth and scope of the present disclosure.

Figure 15:
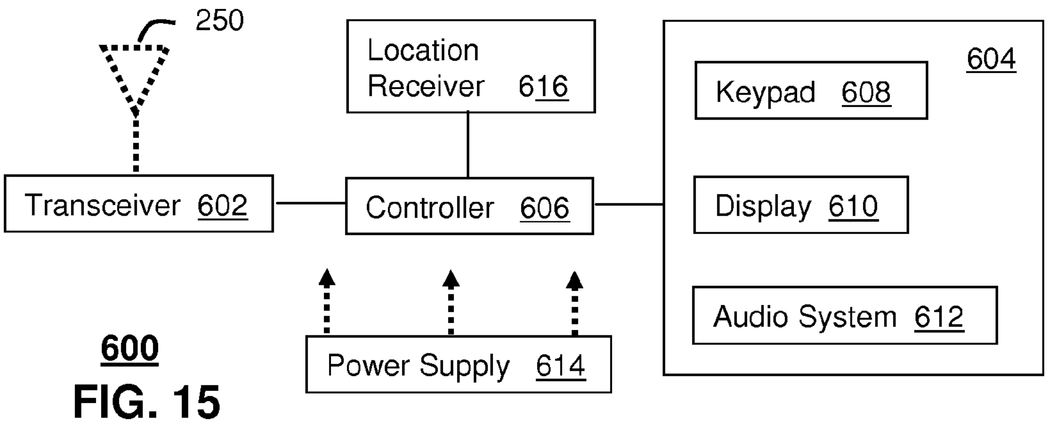
FIG. 15 depicts an exemplary embodiment of a communication device including an antenna.

FIG. 15 depicts an exemplary embodiment of a communication device 600 comprising the antenna 250. As noted previously, the communication device 600 can adjust a directionality of the antenna to compensate for RF propagation losses due to a scattering structure. The communication device 600 can comprise a wired and/or wireless transceiver 602, a user interface (UI) 604, a power supply 614, a location receiver 616, and a controller 606 for managing operations thereof. In an embodiment where the communication device 600 operates in a landline environment, the transceiver 602 can utilize common wireline access technology to support POTS or VoIP services.

In a wireless communications setting, the transceiver 602 can utilize common technologies to support singly or in combination any number of wireless access technologies including without limitation cordless phone technology, Bluetooth™, Wireless Fidelity (WiFi), Worldwide Interoperability for Microwave Access (WiMAX), Ultra Wide Band (UWB), software defined radio (SDR), and cellular access technologies such as CDMA-1X, W-CDMA/HSDPA, GSM/GPRS, TDMA/EDGE, and EVDO.

The UI 604 can include a keypad 608 with depressible or touch sensitive navigation disk and keys for manipulating operations of the communication device 600. The UI 604 can further include a display 610 such as monochrome or color LCD (Liquid Crystal Display) for conveying images to the end user of the terminal device, and an audio system 612 that utilizes common audio technology for conveying and intercepting audible signals of the end user.

The power supply 614 can utilize common power management technologies such as replaceable batteries, supply regulation technologies, and charging system technologies for supplying energy to the components of the terminal device and to facilitate portable applications. In stationary applications, the power supply 614 can be modified so as to extract energy from a common wall outlet and thereby supply DC power to the components of the communication device 600.

The location receiver 616 can utilize common technology such as a common GPS (Global Positioning System) receiver that can intercept satellite signals and therefrom determine a location fix of the communication device 600.

The controller 606 can utilize computing technologies such as a microprocessor and/or digital signal processor (DSP) with associated storage memory such a Flash, ROM, RAM, SRAM, DRAM or other like technologies for controlling operations of the aforementioned components of the terminal device.

Figure 16:
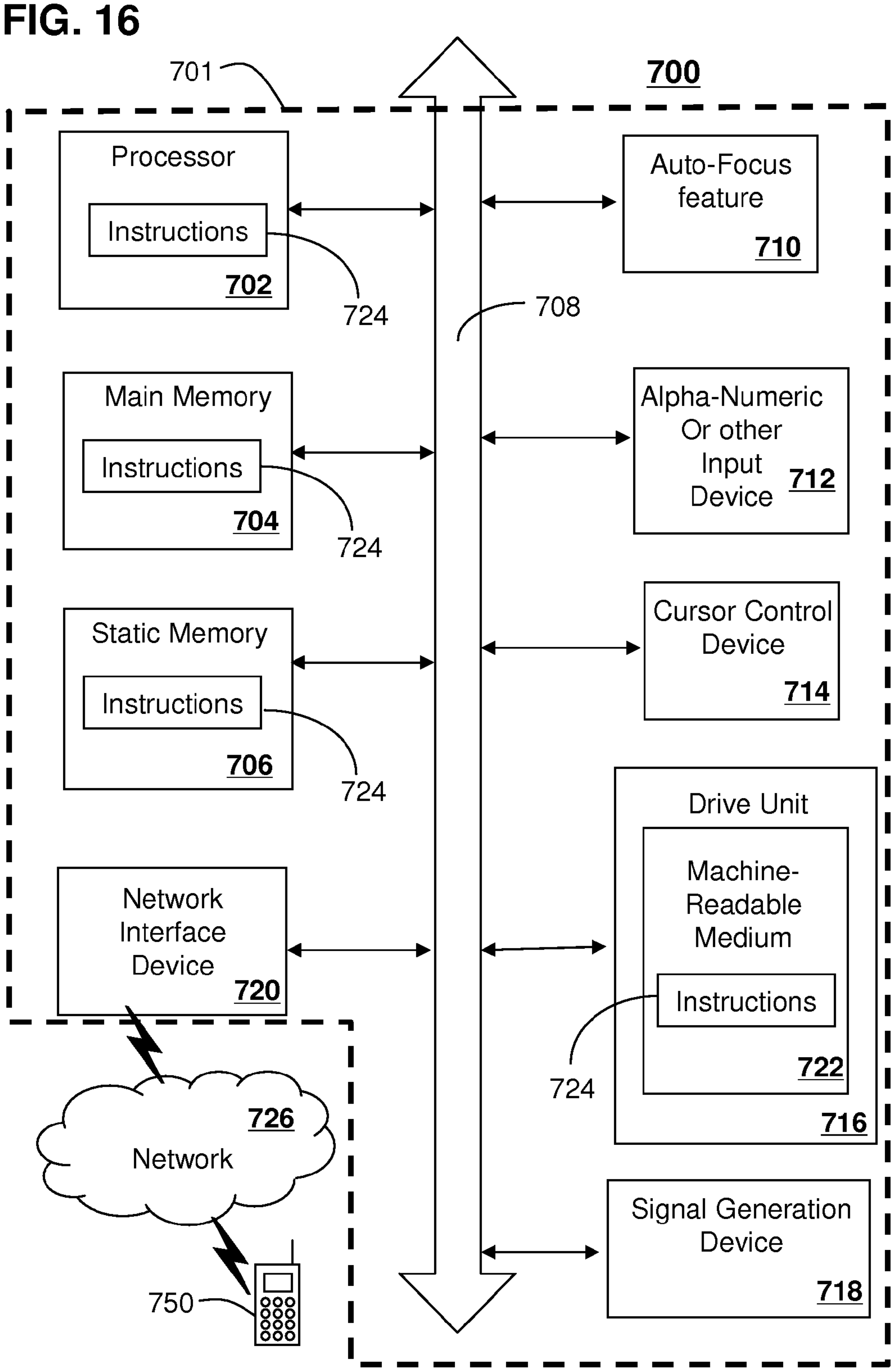
FIG. 16 depicts a diagrammatic representation of a machine in the form of a computer system within which a set of instructions, when executed, may cause the machine to perform any one or more of the methodologies discussed herein

In another embodiment of the present invention as illustrated in the diagrammatic representation of FIG. 16, an electronic product such as a machine (e.g., computer system) providing RF simulations can include a processor or controller 702. Generally, in various embodiments it can be thought of as a machine in the form of a computer system 700 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. For example, the computer system can include a recipient device 701 and a sending device 750 or vice-versa.

The machine may comprise a server computer, a client user computer, a personal computer (PC), a tablet PC, personal digital assistant, a cellular phone, a laptop computer, a desktop computer, a control system, a network router, switch or bridge, or any machine capable of executing a set of instructions (sequential or otherwise) that specify actions to be taken by that machine, not to mention a mobile server. It will be understood that a device of the present disclosure includes broadly any electronic device that provides voice, video or data communication or presentations. Further, while a single machine is illustrated, the term "machine" shall also be taken to include any collection of machines that individually or jointly execute a set (or multiple sets) of instructions to perform any one or more of the methodologies discussed herein.

The computer system 700 can include a controller or processor 702 (e.g., a central processing unit (CPU), a graphics processing unit (GPU, or both), a main memory 704 and a static memory 706, which communicate with each other via a bus 708. The computer system 700 may further include a presentation device such the flexible display 710. The computer system 700 may include an input device 712 (e.g., a keyboard, microphone, etc.), a cursor control device 714 (e.g., a mouse), a disk drive unit 716, a signal generation device 718 (e.g., a speaker or remote control that can also serve as a presentation device) and a network interface device 720. Of course, in the embodiments disclosed, many of these items are optional.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor or controller 702 during execution thereof by the computer system 700. The main memory 704 and the processor or controller 702 also may constitute machine-readable media.

Dedicated hardware implementations including, but not limited to, application specific integrated circuits, programmable logic arrays, FPGAs and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but are not limited to, distributed processing or component/object distributed processing, parallel processing, or virtual machine processing can also be constructed to implement the methods described herein. Further note, implementations can also include neural network implementations, and ad hoc or mesh network implementations between communication devices.

The present disclosure contemplates a machine readable medium containing instructions 724, or that which receives and executes instructions 224 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

In light of the foregoing description, it should be recognized that embodiments in accordance with the present invention can be realized in hardware, software, or a combination of hardware and software. A network or system according to the present invention can be realized in a centralized fashion in one computer system or processor, or in a distributed fashion where different elements are spread across several interconnected computer systems or processors (such as a microprocessor and a DSP). Any kind of computer system, or other apparatus adapted for carrying out the functions described herein, is suited. A typical combination of hardware and software could be a general purpose computer system with a computer program that, when being loaded and executed, controls the computer system such that it carries out the functions described herein.

In light of the foregoing description, it should also be recognized that embodiments in accordance with the present invention can be realized in numerous configurations contemplated to be within the scope and spirit of the claims. Additionally, the description above is intended by way of example only and is not intended to limit the present invention in any way, except as set forth in the following claims.

What is claimed is:

1. A method in a wireless communication device for improving Radio Frequency (RF) Antenna Simulation, the method comprising determining, by the wireless communication device, a proximity of an antenna to a scattering structure;

determining, by the wireless communication device, a switching distance to the scattering structure that establishes when to switch the antenna on and off from a composite antenna pattern to a free space antenna pattern; and predicting, by the wireless communication device, RF coverage of the antenna using either the composite antenna pattern or the free space antenna pattern responsive to the switching, wherein the switching distance is a function of a material type and a surface geometry of the scattering structure, and a wavelength of the antenna.

2. The method of claim 1, comprising:

switching to the composite antenna pattern if the proximity to at least one facet of the scattering structure is less than the switching distance; and turning off reflective contributions of the at least one facet when predicting the RF coverage.

3. The method of claim 1, comprising:

switching to the free space antenna pattern if the proximity to at least one facet of the scattering structure is greater than the switching distance; and turning on reflective contributions of the at least one facet when predicting the RF coverage.

4. The method of claim 1, comprising:

evaluating a sensory mismatch in the antenna; and using a composite antenna pattern corresponding to the sensory mismatch.

5. The method of claim 2, comprising:

selecting from an antenna model database a composite antenna pattern corresponding to the proximity and the scattering structure, wherein the antenna model database includes mappings for a plurality of composite antenna patterns for a plurality of proximities and parameters of the scattering structures.

6. The method of claim 5, wherein the composite antenna pattern includes polarization corrections associated with a material type and a surface geometry of the scattering structure.

7. The method of claim 5, wherein the composite antenna pattern includes radiation corrections associated with a material type and a surface geometry of the scattering structure.

8. A non-transitory computer-readable storage medium operating in a Radio Frequency (RF) planning tool to account for a proximity of an antenna to a scattering structure when predicting RF coverage, the storage medium comprising computer instructions for:

determining a switching distance that is a function of a material type of the scattering structure, a surface geometry of the scattering structure, and a wavelength of the antenna;

switching to a composite antenna pattern if the proximity to at least one facet of the scattering structure is less than the switching distance; and switching to a free space antenna pattern if the proximity to the at least one facet of the scattering structure is greater than the switching distance.

9. The storage medium of claim 8, comprising:

evaluating a sensory mismatch in the antenna; and using a composite antenna pattern corresponding to the sensory mismatch.

10. The storage medium of claim 8, comprising:

identifying the scattering structure from a geographical database based on a location of the antenna.

11. The storage medium of claim 8, comprising turning off reflective contributions of the at least one facet if the proximity to at least one facet of the scattering structure is less than the switching distance.

12. The storage medium of claim 8, comprising turning on reflective contributions of the at least one facet if the proximity to at least one facet of the scattering structure is greater than the switching distance.

13. The storage medium of claim 8, comprising determining the switching distance for x, y, and z axes of the antenna.

14. The storage medium of claim 8, wherein the material type is metallic, dielectric, or inhomogeneous, and the type of surface is wedge or flat.

15. A wireless communication device comprising:

an antenna;

a transceiver operatively coupled to the antenna to transmit and receive Radio Frequency (RF) communications; and a controller to determine a proximity of the antenna to at least one facet of a scattering structure, determine a switching distance that establishes when to switch on and off from a composite antenna pattern to a free space antenna pattern;

predict RF coverage of the antenna using the composite antenna pattern or the free space antenna pattern responsive to the switching; and adjust a directionality of the antenna to compensate for RF coverage losses due to the at least one facet of the scattering structure.

16. The wireless communication device of claim 15, wherein the controller switches to a composite antenna pattern if the proximity to the at least one facet is less than the switching distance; and disregards reflective contributions of the at least one facet when predicting the RF propagation.

17. The wireless communication device of claim 15, wherein the controller switches to a free space antenna pattern if the proximity to the at least one facet is greater than the switching distance; and includes reflective contributions of the at least one facet when predicting the RF propagation.

18. The wireless communication device of claim 15, further comprising a global positioning system (GPS) to determine a location of the wireless communication device, wherein the controller determines from a geographical database the scattering structure corresponding to the location.

19. The wireless communication device of claim 18, wherein the controller determines the switching distance as a function of a material type of the scattering structure, a surface geometry of the scattering structure, and a wavelength.

20. The wireless communication device of claim 19, wherein the material type is metallic, dielectric, or inhomogeneous, and the type of surface is wedge or flat.

* * * * *